(12) United States Patent
Dahl et al.

(10) Patent No.: US 11,328,622 B2
(45) Date of Patent: *May 10, 2022

(54) SYSTEM AND METHOD OF FACILITATING DRIVING BEHAVIOR MODIFICATION THROUGH DRIVING CHALLENGES

(71) Applicant: BlueOwl, LLC, San Francisco, CA (US)

(72) Inventors: Eric Dahl, Newman Lake, WA (US); Micah Wind Russo, Oakland, CA (US); Theobolt N. Leung, San Francisco, CA (US); Kenneth J. Sanchez, San Francisco, CA (US)

(73) Assignee: BLUEOWL, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/088,858

(22) Filed: Nov. 4, 2020

(65) Prior Publication Data

US 2021/0049929 A1 Feb. 18, 2021

Related U.S. Application Data

(63) Continuation of application No. 15/880,143, filed on Jan. 25, 2018, now Pat. No. 10,832,593.

(51) Int. Cl.
*B60W 40/09* (2012.01)
*G09B 19/16* (2006.01)
*G09B 5/06* (2006.01)
*G09B 19/14* (2006.01)

(52) U.S. Cl.
CPC ............. *G09B 19/167* (2013.01); *G09B 5/06* (2013.01); *G09B 19/14* (2013.01)

(58) Field of Classification Search
CPC .. B60W 40/09; B60W 2540/30; G06Q 50/30; G09B 19/167; G09B 9/04
See application file for complete search history.

(56) References Cited

U.S. PATENT DOCUMENTS

| | | |
|---|---|---|
| 6,227,862 B1 | 5/2001 | Harkness |
| 9,691,298 B1 | 6/2017 | Hsu-Hoffman et al. |
| 10,056,008 B1 | 8/2018 | Sweany et al. |
| 2012/0221216 A1 | 8/2012 | Chauncey et al. |
| 2013/0017891 A1 | 1/2013 | Romero et al. |
| 2013/0059607 A1 | 3/2013 | Herz et al. |
| 2013/0164714 A1 | 6/2013 | Hunt et al. |
| 2014/0142805 A1 | 5/2014 | Frye |
| 2016/0244067 A1 | 8/2016 | Hunt et al. |
| 2016/0293049 A1 | 10/2016 | Monahan et al. |
| 2017/0144671 A1 | 5/2017 | Memani et al. |
| 2017/0322907 A1 | 11/2017 | McQuade et al. |
| 2019/0100216 A1 | 4/2019 | Volos et al. |

*Primary Examiner* — Omkar A Deodhar
(74) *Attorney, Agent, or Firm* — Faegre Drinker Biddle & Reath LLP

(57) ABSTRACT

Systems and methods for generating and communicating challenges that are intended to improve driving behavior are provided. According to certain aspects, a backend server may receive vehicle data describing the vehicle's operation or the vehicle operator from sensors or an electronic device. The backend server may compare target parameters and the vehicle data and, optionally, data from an external information source, to determine differences and calculate risk. The backend server may transmit challenges to the electronic device, and may generate a comparison factor and process an account of a the vehicle operator based on updated vehicle data received from the electronic device.

20 Claims, 5 Drawing Sheets

SYSTEM AND METHOD OF FACILITATING DRIVING BEHAVIOR MODIFICATION THROUGH DRIVING CHALLENGES

CROSS-REFERENCE TO RELATED APPLICATION

The present application is a continuation of U.S. Non-Provisional application Ser. No. 15/880,143, filed Jan. 25, 2018, the entire disclosure of which is hereby expressly incorporated herein by reference.

TECHNICAL FIELD

The present disclosure is directed to challenging drivers to improve driving behavior over time. More particularly, the present disclosure is directed to systems and methods for receiving vehicle operation data associated with operation of a vehicle by a vehicle operator, determining a difference between the vehicle operation data and a target vehicle operation parameter, generating and displaying challenges to the vehicle operator intended to improve driving behavior, and processing an account of the vehicle operator.

BACKGROUND

Vehicle operation data may include information captured from sensors, behavioral data, and environmental data. Sensor data may be obtained from sensors affixed to or otherwise associated with a vehicle such as a car, truck, motorcycle, or other conveyance; or that may be carried onboard by a vehicle operator or passenger. For example, many new production vehicles include sources of sensor data (e.g., speed, acceleration, location) and are capable of connecting to computer networks such as the Internet; further, many vehicle operators possess and regularly carry smart phones while driving. Behavioral data may be obtained from a vehicle operator using a sensor. Environmental data may be obtained from any source and may be historical or real-time. Generally, vehicle operation data comprises that data generated by operation of the vehicle itself. Vehicle operation data may be used to analyze driving behavior, and/or to infer behavioral patterns, in light of environmental or contextual conditions, by comparison to target parameters.

Humans are imperfect drivers, and may adopt negative driving behaviors due to inexperience, fatigue, hastiness, distraction, or other factors. The behavior exhibited by vehicle operators may appear to be irrational, distracted, and/or aggressive, and one vehicle operator's negative driving decision may encourage other vehicle operators to behave similarly. Some vehicle operators may lack the discipline, time, or motivation to objectively judge and modify their own driving behavior.

Accordingly, there is an opportunity to leverage vehicle operation data to challenge vehicle operators to improve driving behavior.

BRIEF SUMMARY

A computer-implemented method in an electronic device of improving driving behavior by a vehicle operator of a vehicle is provided. The method may include receiving a set of vehicle operation data associated with operation of the vehicle by the vehicle operator, accessing at least one target vehicle operation parameter corresponding to at least a portion of the set of vehicle operation data, determining, by a computer processor, a difference between the set of vehicle operation data and the at least one target vehicle operation parameter, generating a challenge according to the difference, the challenge configured to encourage the vehicle operator to modify driving behavior, transmitting the challenge to an electronic device associated with the vehicle operator, the electronic device configured to present the challenge for review by the vehicle operator, after displaying the challenge, receiving a set of updated vehicle operation data associated with additional operation of the vehicle by the vehicle operator, comparing at least a portion of the set of updated vehicle operator data to the at least one target vehicle operation parameter to generate a comparison factor; and based on the comparison factor, processing an account of the vehicle operator.

A system for improving driving behavior by a vehicle operator of a vehicle is provided. The system may comprise a transceiver configured to communicate via a network connection, a memory configured to store non-transitory computer executable instructions, and a processor configured to interface with the transceiver and the memory. The processor may be configured to execute the non-transitory computer executable instructions that, when executed, cause the processor to receive a set of vehicle operation data associated with operation of the vehicle by the vehicle operator, access at least one target vehicle operation parameter corresponding to at least a portion of the set of vehicle operation data, determine, by a computer processor, a difference between the set of vehicle operation data and the at least one target vehicle operation parameter, generate a challenge according to the difference, the challenge configured to encourage the vehicle operator to modify driving behavior, transmit the challenge to an electronic device associated with the vehicle operator, the electronic device configured to present the challenge for review by the vehicle operator, after displaying the challenge, receive a set of updated vehicle operation data associated with additional operation of the vehicle by the vehicle operator, compare at least a portion of the set of updated vehicle operator data to the at least one target vehicle operation parameter to generate a comparison factor; and based on the comparison factor, process an account of the vehicle operator.

DETAILED DESCRIPTION

Figure 1:
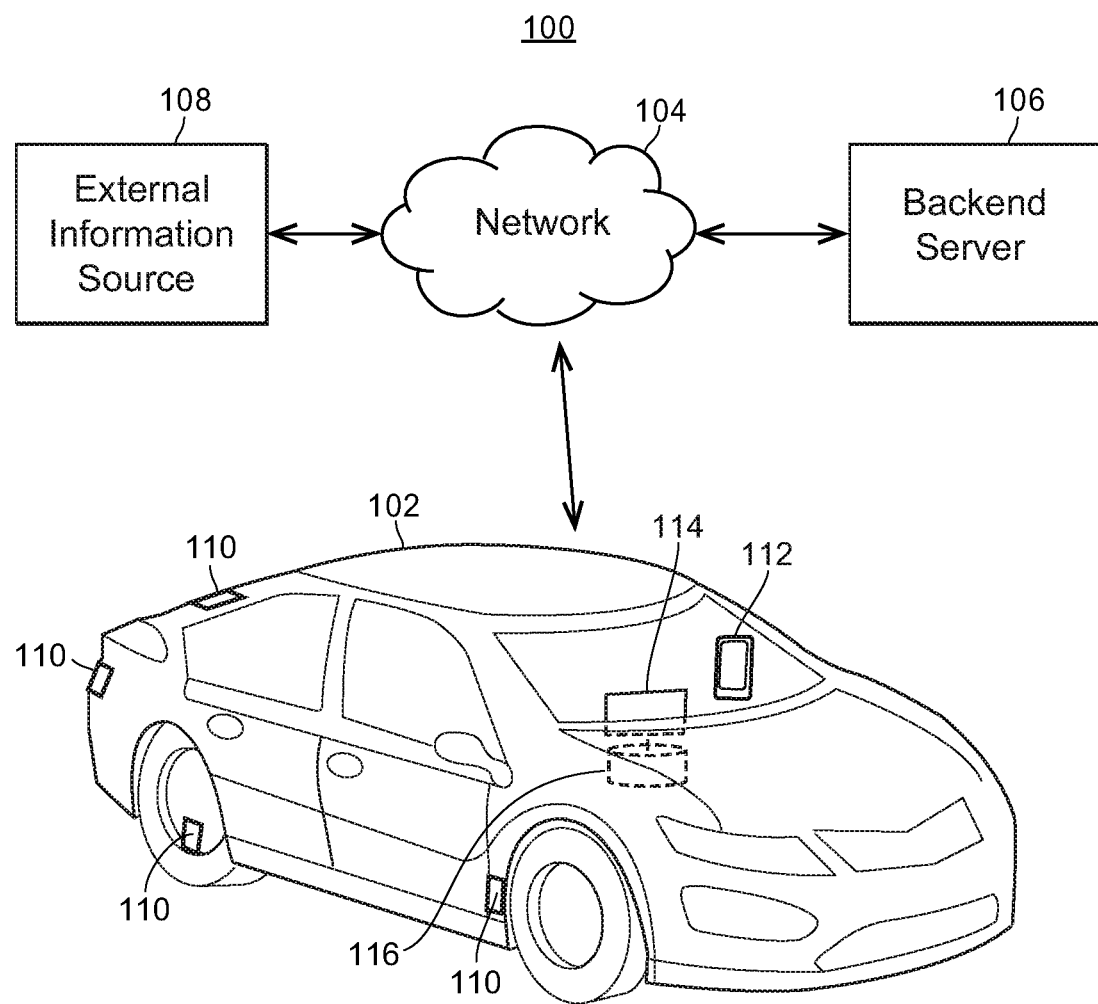
FIG. 1 depicts an example environment including vehicle and infrastructure components, in accordance with embodiments.

The present embodiments may relate to, inter alia, receiving vehicle operation data, generating challenges, and processing the account of a vehicle operator. According to certain aspects, methods and systems may access sensor data associated with vehicle operation. The methods and systems may compare the vehicle operation data to target vehicle operation parameters to determine differences. The methods and systems may generate and present challenges intended to encourage the vehicle operator to modify driving behavior. The challenges may be displayed on a user interface located in the vehicle, that may be part of an electronic device, a built-in system, etc. The systems and methods may receive updated vehicle operation data and compare the updated data to the target vehicle operation parameters to determine a comparison factor that may be used to process the account of the vehicle operator.

Therefore, the methods and systems offer numerous benefits. In particular, the methods and systems incentivize safe driving behavior and discourage unsafe driving behavior. Because the methods and systems are able to examine objective vehicle operation data, they are able to generate and provide customized challenges addressing risks specific to each individual driver's real world driving. Further, because the method and systems process vehicle operator accounts based on updated vehicle operation data, the methods and systems may offer customized incentives for vehicle operators to avoid risky behavior on a continuous and ongoing basis. It should be appreciated that additional benefits are envisioned.

According to implementations, the methods and systems may support dynamic, real-time or near real-time determining of differences of any captured, received, and/or detected data. In particular, the methods and systems may receive data from the vehicle in real-time or near real-time, and may automatically and dynamically compare the received data to target data. The methods and systems may receive vehicle data and may automatically and dynamically generate challenges based on cached or pre-fetched parameters that correspond to specific behaviors and/or quantities that are known to be of lower risk. The challenges may be based on a general template and new templates may be built up and added to the methods and systems, along with corresponding parameters. Consequently, any vehicle operator reading a challenge on a display may expect that the challenge is based on timely and critically relevant vehicle operation data.

In operation, the methods and systems may be configured to receive or otherwise access vehicle operation data captured by any combination of sensors associated with the vehicle. Further, the methods and systems may access user profile data that may be stored in persistent storage or memory, and may compare the received data to, or associate the received data with, the user profile data. In addition, the methods and systems may further interface with other components to assess real-time environmental data associated with the operation of the vehicle (e.g., speed, location, route information, current time, current date, weather).

FIG. 1 depicts an example environment 100 associated with the methods and systems. The environment 100 may include a vehicle 102, one or more networks 104, a backend server 106, one or more external information sources 108, and one or more sensors 110. The vehicle 102 may be associated with at least one electronic device 112. The vehicle 102 may include a built-in system 114, and the one or more sensors 110. The sensors 110, the electronic device 112, and/or the built-in system 114 may be communicatively coupled via a wireless or wired vehicle network. Each of the components may be any combination of physical hardware and software components. The built-in system 114 and/or the electronic device 112 may include a graphical display (e.g., a display screen) configured to display audio and/or visual content, such as challenges.

According to some embodiments, the vehicle 102 may be any wheeled conveyance; for example, a passenger car, motorcycle, motorized scooter, dune buggy, all-terrain vehicle (ATV), go-cart, truck, or the like. In an embodiment, the vehicle 102 may be a gasoline-powered vehicle, electric vehicle, or a hybrid vehicle. In some embodiments, an individual vehicle operator may operate (i.e., drive) the vehicle 102. The individual may sit in the driver's seat of the vehicle 102 and operate the vehicle 102; however, the individual may be a passenger of the vehicle 102, and may sit in a front passenger seat or any of a set of rear passenger seats. In embodiments in which the individual is a passenger, another individual may operate the vehicle 102 or the vehicle 102 may be operated autonomously.

In an embodiment, the network 104 may be a mobile telecommunications network such as a 3G or 4G network; a wireless local area network (WLAN), satellite communication network, terrestrial microwave network, or any suitable wireless network.

In an embodiment, the backend server 106 may be communicatively coupled to the vehicle 102 and its individual components (e.g., the one or more sensors 110) via the network 104. The backend server 106 may be associated with or owned by an entity or company related to the vehicle operator. For example, the backend server 106 may be owned by a company that is the issuer or underwriter of an insurance policy associated with the vehicle and/or the vehicle operator. The backend server 106 may reside in a data center or other networked infrastructure owned, leased, and/or controlled by a company associated with an insurance policy covering the vehicle. The backend server 106 may be associated with an electronic database that is located on the backend server 106 or that is otherwise accessible via a computer network. In an embodiment, the backend server 106 may comprise a single server computer or a cluster of multiple servers. The backend server 106 may be implemented in a cloud computing and/or virtualized environment, in an embodiment.

In an embodiment, the external information source 108 may be accessed via an API (e.g., a REST or SOAP web service) and may comprise a database, and/or any other source of electronic information. The external information source 108 may be operated by an entity operating the backend server 106 or by a third party entity. The external information source 108 may represent a service that is a paid or unpaid subscription service and may be communicatively coupled to the backend server 106, and/or to the vehicle 102 and its individual components via the network 104.

FIG. 1 illustrates an embodiment of a vehicle 102 comprising four sensors 110. The one or more sensors 110 are depicted as being installed within the interior of the vehicle 102 and affixed to the exterior of the vehicle 102. In the precise embodiment depicted in FIG. 1, individual sensors 110 are located near the windshield, rear bumper, tire, and trunk of the vehicle 102. In some embodiments, the sensors 110 may be permanently installed or may be relocatable, and the type and/or number of sensors 110 may vary. Further, the sensors 110 may be located at various alternate or additional locations of the vehicle 102, including the vehicle 102 exterior. It should be appreciated that many useful sensor configurations are envisioned.

Each of the sensors 110 may be configured to detect and convey physical measurement data, including without limitation: photographic (still or video), infrared, temperature, audio, speed and acceleration, humidity, and atmospheric pressure. Each of the sensors 110 may generate digital data according to the detected information, where the digital data is of a standard file encoding or format, and/or may be compressed. Although not specifically depicted in FIG. 1, the vehicle 102 may include one or more microphones arranged in one or more locations, configured to capture audio data. The sensors 110 may capture data autonomously or upon request. One or more sensors 110 may be synchronized (e.g., a first sensor may collect audio data and a second corresponding video data).

In an embodiment, the one or more sensors 110 may be configured to collect vehicle operation data (e.g., telematics data) specific to the operation of the vehicle 102. According to embodiments, the vehicle operation data may include speed, position, heading, turning, acceleration, brake status, and/or other data. Each of the sensors 110 may be configured independently of one another to transmit data directly to the backend server 106 or any other component.

The vehicle 102 may be outfitted with an electronic device 112 configured with any combination of hardware and software components. In some embodiments, the electronic device 112 may be included as part of an on-board diagnostic system or any other type of system configured to be installed in the vehicle, such as an original equipment manufacturer (OEM) system, or an after-market system. The electronic device 112 may itself include a set of built-in sensors configured to capture vehicle information (e.g., telematics data) associated with the vehicle 110's functioning and environment. In an embodiment, the sensors associated with the electronic device 112 may constitute the only sensors present in the vehicle 102. In an embodiment, the electronic device 112 may be configured to communicate with (i.e., by requesting, accessing, retrieving, or receiving data from) a set of sensors arranged within or affixed to the vehicle, such as each of the sensors 110. In another embodiment, the electronic device 112 may be configured to interface with additional components of the vehicle 102. In particular, the electronic device 112 may interface with any of the sensors 110, and/or other components of the vehicle 102. Further, the vehicle 102 and/or each of the one or more sensors 110 and/or the electronic device 112 may be equipped with storage or memory capable of storing various data. In an embodiment, the set of built-in sensors included in the electronic device 112 and/or the sensors 110 may be of various types, including without limitation, a location module (e.g., a global positioning system (GPS) module), an accelerometer, an ignition sensor, clock, speedometer, torque sensor, throttle position sensor, image capture sensors, gyroscope, and/or other types of sensor.

An individual who may be an operator or passenger of the vehicle 102 may access and interface with the electronic device 112 or other component(s) that may be located within the vehicle 102, in some embodiments. The individual may hold the electronic device 112 within their grasp; however, it should be appreciated that in some embodiments, the individual may not make physical contact with the electronic device 112, even if the electronic device 112 is located inside the vehicle. For example, the electronic device 112 may be secured within a mounting. In an embodiment, the electronic device 112 may be a device that is permanently installed into the console of the vehicle 102, or is installed as an OEM device, or by an after-market provider. The electronic device 112 may be owned by the vehicle operator, or rented or lent to the vehicle operator.

In an embodiment, the electronic device 112 may be any type of electronic device such as a mobile device (e.g., a smartphone). It should be appreciated that other classes of electronic and/or mobile devices are envisioned, such as notebook computers, tablets, phablets, GPS or GPS-enabled devices, smart watches, smart glasses, smart bracelets, wearable electronics, personal digital assistants (PDAs), pagers, computing devices configured for wireless communication, and/or the like. The sensors associated with the electronic device 112 may contain sensors having any of the types/capabilities as those discussed above with respect to sensors 110.

The built-in system 114 may be configured, like the electronic device 112, to analyze the vehicle operation data to determine a state of the vehicle operator and/or the vehicle environment, and may assess any risks associated with operation of the vehicle 102. The built-in system 114 may store or cache data in the electronic database 116, and/or may stream data to the backend server 106 via the network 104 in real-time or after a configurable delay. The built-in system 114 may be an OEM or after-market system included by the vehicle manufacturer or a third party, including the entity or company owning and/or controlling the backend server 106. The built-in system 114 may be a combination of hardware and software that includes additional software provided by the entity or company owning and/or controlling the backend server. The various capabilities related to the components depicted in FIG. 1 are depicted and discussed in further detail in FIGS. 2-5.

Figure 2:
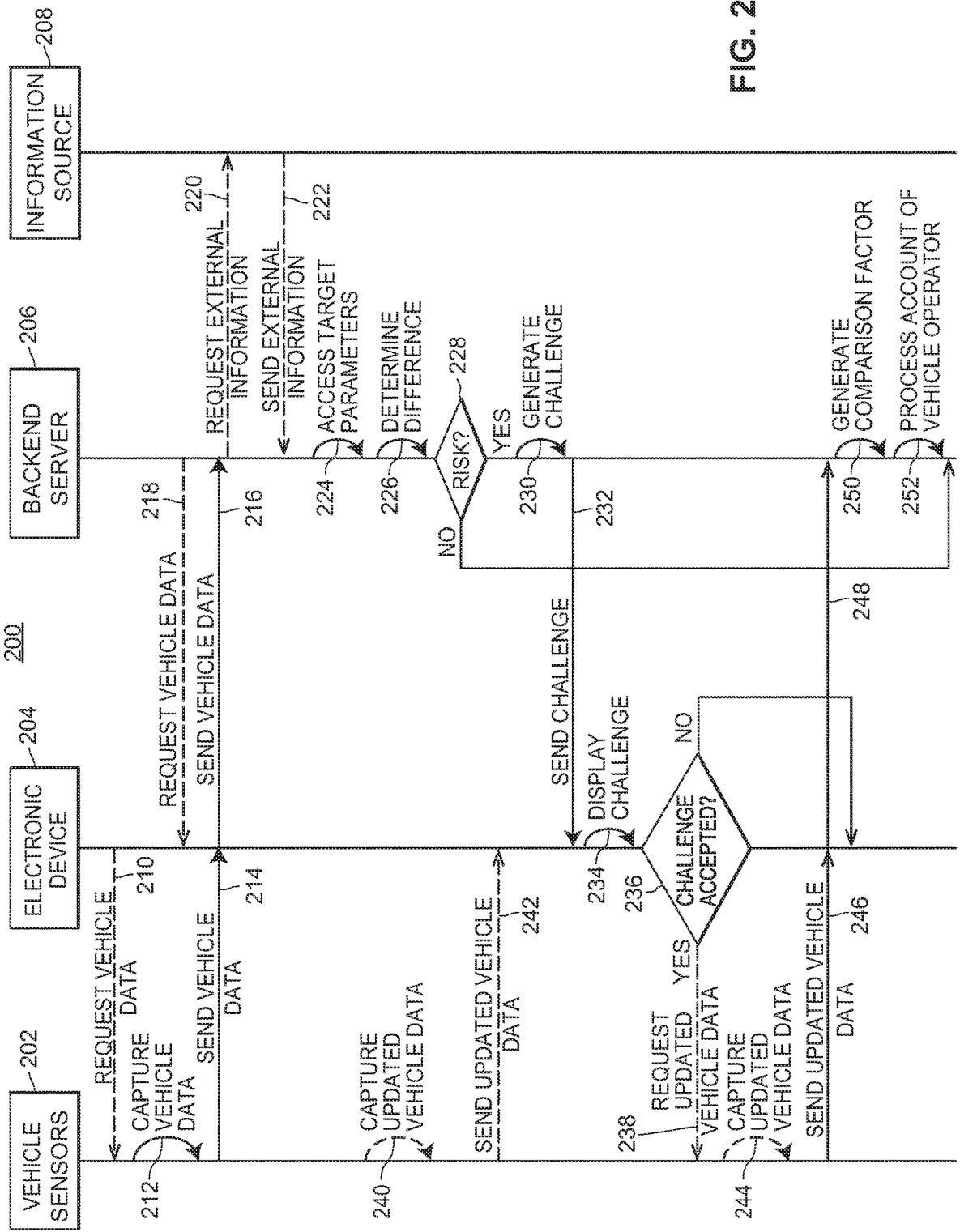
FIG. 2 depicts an exemplary signal diagram associated with receiving vehicle data, accessing at least one target vehicle operation parameter, determining a difference between the set of vehicle operation data and the at least one parameter, facilitating challenges issued to the operator of a vehicle, and processing a vehicle operator account, in accordance with some embodiments.

FIG. 2 depicts a signal diagram 200 associated with facilitating certain functionalities associated with the methods and systems described herein. The signal diagram 200 includes one or more vehicle sensors 202 (such as one of the sensors 110 as discussed with respect to FIG. 1), an electronic device 204 (such as the electronic device 112 as discussed with respect to FIG. 1), a backend server 206 (such as the backend server 106 as discussed with respect to FIG. 1), and an external information source 208 (such as the external information source 108 as discussed with respect to FIG. 1). According to embodiments, the electronic device 204 may be located within a vehicle that may correspond to the vehicle 102 as discussed with respect to FIG. 1. It should be appreciated that additional or alternative components and devices, and arrangements thereof, are envisioned. Generally, the external information source 208 may be a local, remote, or external resource.

The signal diagram 200 may begin where the electronic device 204 optionally requests (210) vehicle data from the one or more vehicle sensors 202. The vehicle data request 210 may be in the form of an HTTP GET or POST request, or another electronic protocol. As discussed above with respect to FIG. 1, the sensors 202 may be configured to detect and transmit vehicle data. In an embodiment, the electronic device 204 may automatically and periodically request vehicle data (e.g., once every 2 seconds, once per minute, once every hour, etc). The request (210) for vehicle data may be continuous or streaming. Alternatively, the electronic device 204 may be caused to request (210) the vehicle data from the one or more vehicle sensors 202 based upon an action taken by a user of the electronic device 204 or another component.

The one or more vehicle sensors 202 may capture (212) vehicle data and send (214) vehicle data to the electronic device 204. Generally, capturing (212) vehicle data refers to the process whereby a physical sensor comprising one of the vehicle sensors takes an environmental reading (e.g., a photograph, video frames, current temperature, sound waves, etc.) and/or saves a digital representation to a memory or solid state disk. In some embodiments, the vehicle sensors 202 may include a cache or memory storage module that may serve as a temporary cache of vehicle data prior to the sensors 202 sending (214) the vehicle data. The vehicle sensors 202 may be installed in the vehicle 202 when it is sold by the manufacturer or may be retrofitted to the vehicle 202 by a vehicle dealership, or another entity (e.g., the company that owns the backend server 206). In an embodiment, the vehicle sensors 202 may be provided to the vehicle operator along with installation instructions for the vehicle operator.

The vehicle sensors 202 may send (214) the vehicle data to the electronic device 204, and may compress or encode the vehicle data by a codec or driver. In an embodiment, sending (214) may be prompted by the occurrence of an event associated with a vehicle operator or an event associated with the vehicle. For example, a sensor 202 may be pre-programmed to send (214) vehicle data if a turn signal is engaged by a vehicle operator or in the event the vehicle has its automatic headlights engaged. Alternately, a sensor 202 may be pre-programmed to send (214) vehicle data if an environmental condition is met (e.g., if the temperature outside the vehicle drops below 32 degrees Fahrenheit). As above, the sending (214) of vehicle data may be performed via HTTP or other standardized or proprietary/custom protocol request(s).

The electronic device 204 may receive the vehicle data sent (214) by the vehicle sensors 202. For example, the electronic device 204 may receive the current temperature in the vehicle environment. As discussed above with regard to FIG. 1, the electronic device 204 may comprise a mobile device. The electronic device 204 may run a software program that processes the vehicle data sent (214) by the vehicle sensors 202. The electronic device 204 may send (216) the vehicle data to the backend server 206. In embodiments, the electronic device 204 may transform the vehicle data or may act as a pass-through. The vehicle data may be buffered in a temporary cache in the memory of the electronic device 204, or may be immediately streamed elsewhere and not stored. The vehicle data may be stored in a solid state disk or electronic database associated with the electronic device 204. The electronic device 204 may send (216) the vehicle data on a pre-programmed schedule or based on an optional request (218) for vehicle data from another component (as depicted in an embodiment, from the backend server 206). The electronic device 204 may maintain a persistent or streaming connection to another component and stream data to the other component, and/or may send (216) vehicle data when it receives data from the one or more sensors 202. In some embodiments, the processes of receiving vehicle data from the vehicle sensors 202 and/or sending data to the electronic device 204 may be implemented in multiple threads and/or processes within the electronic device 204. In an embodiment, the electronic device 204 may supplement, combine, or associate vehicle data with sensor data from additional sensors installed in or associated with the electronic device 204.

As noted, in some embodiments, the backend server 206 may optionally request (218) vehicle data from the electronic device 204, for example, before the electronic device 204 sends (216) vehicle data to the backend server 206. A request for vehicle data (218) from the backend server 206 may include parameters specifying attributes of the data being requested from the electronic device 204. For example, the backend server 206 may request vehicle data (218) specifying the type of data as GPS data and the time period as 1:00 PM-1:20 PM on March 1st. In an embodiment, the backend server 206 may store the vehicle data to a solid state disk and/or buffer the data to a memory. In some embodiments, the backend server 206 may process vehicle data sent (216) from the electronic device 204 in real-time.

In an embodiment, the backend server 206 may access profile data associated with one or more vehicle operators from the electronic device 204. In some embodiments, the one or more vehicle operators may be registered or otherwise associated with the vehicle (e.g., one or more registrants of the vehicle) or associated with a software application installed on the electronic device 204. The electronic device 204 may access the profile data from local memory and transmit an identifier to the backend server 206 via a network connection. According to embodiments, the profile data may include a set of attributes, characteristics, and/or the like that may describe the one or more vehicle operators. For example, the profile data may include the name, age or gender of the one or more vehicle operators. Vehicle sensor data may be stored on the electronic device 204 and/or backend server 206, and may be annotated by, or associated with, profile data.

The external information source 208 may be, as indicated above, owned and/or controlled by the entity or company owning and/or controlling the backend server 206, or a different entity or company. The external information source 208 may contain historical and/or current information, and may be continuously updated (for example, with real-time weather data for an area). In an embodiment, historical information may include data about the vehicle operator's driving patterns and/or the environment in which the vehicle is operating. In some embodiments, the backend server 206 may request (220) information from an external information source 208.

In an embodiment, the external information source 208 may accept a query and/or parameters from the backend server 206 in the request (220) for external information, and the external information source 208 may perform a computation or calculation using the query and/or parameters. For example, the external information source 208 may expose an application programming interface (API) for accessing weather data, wherein the API accepts a zip code as a parameter and in response sends (222) weather data corresponding to that zip code to the backend server 206.

In general, the backend server 206 may analyze the vehicle data to identify a set of events undertaken by the vehicle during operation of the vehicle. For example, the backend server 206 may analyze GPS coordinates from the vehicle data to infer the road on which the vehicle is traveling, and accelerometer data to determine lane change and/or braking events.

In some embodiments, the request (220) for external information may be implemented in a separate thread or process. The request (220) for external information may be made via a standard protocol such as HTTP, and may require authentication, in an embodiment. The external information source 208 may optionally send external information 222 to the backend server 206, in an embodiment. The external information 222 may comprise data such as current or historical weather conditions, or the result of computation(s) performed by the external information source 208.

In an embodiment, the backend server 206 may access (224) target parameters. In some embodiments, risk may be determined (228) by the backend server 206. Target parameters may be calculated to minimize risk and may be obtained from the backend server 206 and/or an external information source 208. Target parameters may include single numeric values, ratios (e.g., 10 miles/hour), or other mathematical expressions. In some embodiments, target parameters may comprise absolute limits. For example, a target parameter may dictate that under no circumstances may a vehicle's speed exceed 100 miles per hour (mph). For example, assuming that vehicle data was sent (216) to the backend server 206 indicating a vehicle speed of 110 mph, the backend server 206 may access (224) its target parameter(s) for speed, compare the two to determine (226) a difference, and note that the vehicle speed was higher than a target speed parameter of 100 mph.

Risk may be determined (228) by the backend server 206 analyzing vehicle data sent (216) to the backend server 206, on its own or in combination with any external information (222). According to embodiments, the risk may be to any or all of the vehicle operator, any other occupant, the vehicle (for example, the vehicle 102 depicted in FIG. 1), other vehicles on the road, the operators of the other vehicles, pedestrians, or physical items within a vicinity or projected vicinity of the vehicle. The backend server 206 may determine that the vehicle operator is at risk of causing an accident that may affect one or more vehicles, operators, passengers, pedestrians, and/or objects, and may take into account a projected or future path or movement based on an analysis of telemetry data (e.g., speed, heading, location) received from the electronic device 204 or the one or more vehicle sensors 202. The backend server 206 may base its determination of risk on the future path in conjunction with other information.

In an embodiment, risk may be determined (228) as a weighted probability of multiple factors. For example, the speed of a vehicle alone may not be sufficient to meet or exceed a risk threshold, but when combined with inclement weather and darkness may increase the likelihood of an accident such that the backend server 206 will determine (228) sufficient risk is present to exceed a preset threshold. In that case, the threshold may constitute a 10% likelihood that an accident will occur, wherein each of speed, darkness, and inclement weather each account for 5%, thus bringing the total likelihood of an accident to 15%, exceeding the threshold, and causing the backend server 206 to determine (228) that a risk is posed, and to generate a challenge (230). In general, the backend server 206 may ascertain risks and determine whether risks are posed via multiple techniques, algorithms, and deductions.

In some embodiments, if the backend server 206 determines that the vehicle data does not determine (228) a risk, then processing may cease, may branch into alternate functionality, or may reiterate. If the backend server 206 determines that the vehicle data does determine (228) a risk, then the backend server 206 may assign a priority level (e.g., low, medium, high, critical) to the risk. In an embodiment, the backend server 206 determines (226) a difference between vehicle data and target parameters, and, if a risk is determined to exist (e.g., by determining whether the difference meets or exceeds a threshold) generates (230) a challenge, as discussed below.

It should be noted that target parameters may be programmed to depend on a variety of factors. For example, the target parameter for speed may be 70 mph for passenger vehicles, and 65 mph for trucks. Many other factors are envisioned. In some embodiments, target parameters may be context-specific. Target parameters may take into account one or more data points pertaining to the environment in which the vehicle is driving, or is predicted to be driving in. Target parameters may be based wholly, or in part, on laws and/or regulations governing driving in a given geographic region. Thus, in some embodiments, a single target parameter may change as environmental conditions change.

For example, the backend server 206 may access (224) a target parameter for the maximum speed on a roadway, specifying the GPS coordinates of the vehicle as a parameter in a request (220) for external information to the external information source 208. The external information source 208 may determine that based on the location parameter, the vehicle is located on Interstate 80 in the State of Illinois, and that the speed limit on I-80 is 70 mph. The external information source 208 may send (222) the target parameter of 70 mph to the backend server 206. Assuming vehicle data sent (216) by a speed sensor in the vehicle indicates a speed of 80 mph, the backend server 206 may compare the vehicle data speed of 80 mph to the target parameter of 70 mph and determine (226) a difference of +10 mph. Having determined (226) a positive difference, a risk may be determined (228). In some embodiments, both speed and location may be sent to the external information source 208 and the external information source 208 may return a boolean value such as SPEEDING or NOT-SPEEDING, that the backend server 206 may use in further processing. i.e., in an embodiment, the ultimate determination of risk may be performed by the backend server 206 and/or the external information source 208.

In an embodiment, the above example may continue such that after the passage of time (e.g., seconds or minutes) the backend server 206 may again access (224) a target parameter for the maximum speed on I-80, again specifying the GPS coordinates of the vehicle as a parameter. The external information source 208 may then determine that the vehicle is located in the State of Iowa, and that the governing speed limit has changed to 80 mph. The external information source 208 may send (222) a target parameter of 80 mph to the backend server 206. Assuming the speed of the vehicle has not changed (i.e., the vehicle data sent (216) continues to indicate a speed of 80 mph), no risk may be determined (228) after the backend server 206 compares the vehicle data sent (216) to the updated target speed parameter of 80 mph, because the vehicle is traveling the speed limit. It should be appreciated that subsequent speed comparison(s) may be based on an average or moving average of speed observed in vehicle data at multiple points in time.

Figure 3:
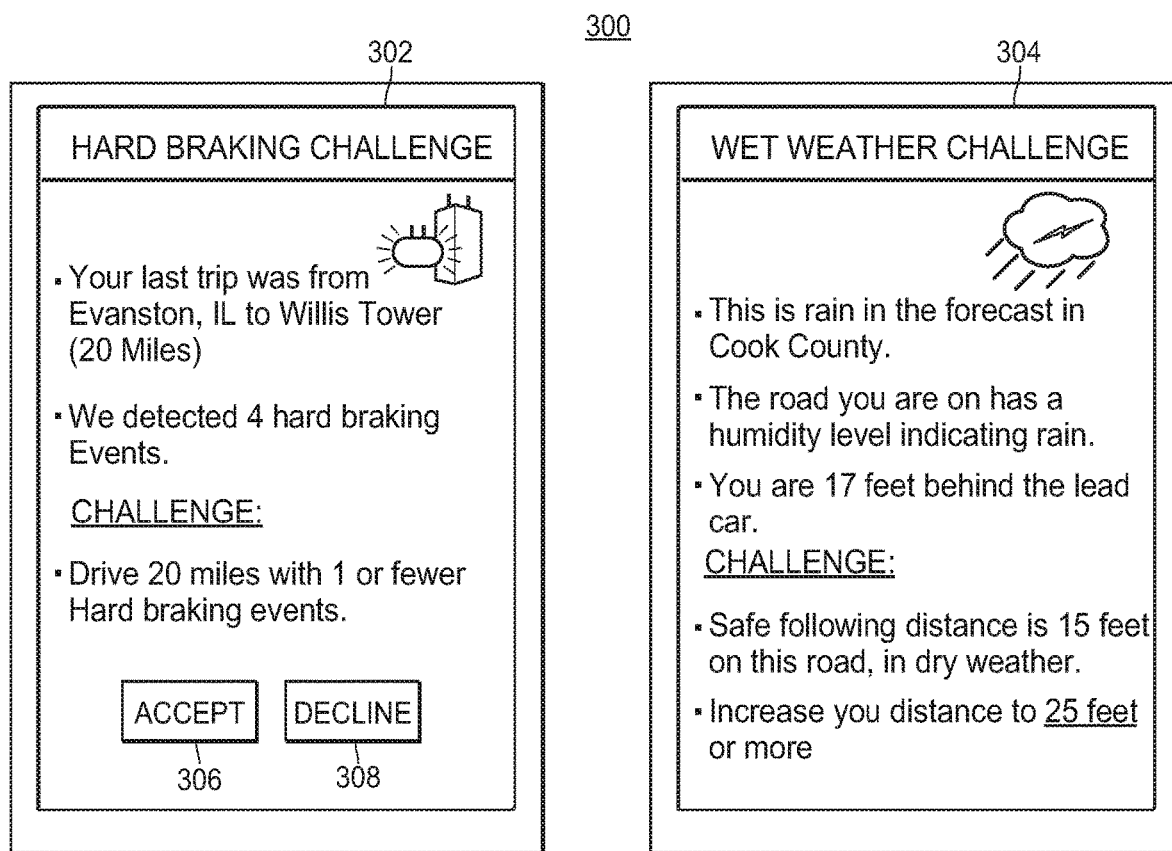
FIG. 3 depicts user interfaces associated with example challenges, in accordance with some embodiments.

In some embodiments, a variance may be associated with each target parameter. For example, a speed of 10% more or less than the target speed parameter may be sufficient to indicate that risk is present. Then, in the aforementioned example in the State of Illinois, risk would not be indicated for speeds up to and including 77 mph (i.e., the 70 mph target parameter+10% of that parameter), but because the vehicle was observed in the vehicle data to be traveling at 80 mph, risk would be indicated and a challenge would be generated (230). Challenges with respect to FIG. 3 are discussed in more detail below.

It should be appreciated that in some embodiments the determination (228) of risk may be determined based on vehicle data from multiple and/or composite vehicle sensor(s) 202. For example, a vehicle operator may be considered to be "tailgating" or following too closely a lead car if the vehicle operator allows the vehicle to approach within a given distance of the lead car. On a roadway with a 60 mph speed limit, the safe following distance target parameter may equal ">=100 feet". If vehicle data sent (214) to the backend server 206 indicates that the vehicle is following at a distance of less than 100 feet, risk may be determined (228), based on the determined (226) difference, and a challenge generated as discussed below in greater detail, instructing the vehicle operator to maintain a distance of 100 feet or more between the vehicle and the lead car. In that case, the determination (228) of risk may be based on the distance between the lead car and the vehicle, as detected via optical or other means, through the use of one of the one or more vehicle sensors 202. To further the example, an additional vehicle sensor(s) 202 may further detect the presence of humidity indicating that the road surface is wet. In that case, the backend server 206 may adjust the initial safe following distance target parameter of 100 feet to 175 feet, based on the presence of the wet road. In this example, risk would be determined (228) if a vehicle operator was observed via vehicle data to be traveling (for example) 125 feet behind the lead car.

Further, as discussed above, the backend server 206 may access profile data from the electronic device 204. In some embodiments, profile data may be used in conjunction with target parameters. Risk may be determined (228) based on a combination of vehicle operator attributes and other factors. For example, the backend server 206 may determine that a speed of 5% more or less than the target speed parameter may be sufficient to indicate that risk is present, given profile data indicating that the vehicle operator is under the age of 18. Similarly, risk may be indicated if vehicle data and profile data indicate an 18-year old driver's speed exceeds a specified target parameter (e.g., 75 mph). In general, it should be appreciated that the analysis of one or more factors may affect the determination (228) of risk.

It should be noted with respect to target parameters that many more combinations and analyses of target parameters, both contextual and absolute; both stored on the backend server 206 and requested from the external information source 208; are possible. Further, "risk" is not always a boolean proposition. Risk may be represented by a continuous or weighted scale, as discussed below.

In an embodiment, challenges may be generated (230) and sent (232) to the electronic device 204 for display (234) to the vehicle operator if a risk is determined (228) based on the accessing (224) of target parameters and determining (226) of differences between those target parameters and actual vehicle data received by the backend server 206. In general, challenges sent (232) are messages to vehicle operators that challenge, encourage, and/or incentivize the vehicle operators to take a specific action or refrain from taking a specific action, while operating the vehicle. As in the example given above, the determination (226) of a difference of 10 mph in a 70 mph speed limit zone in the State of Illinois, with an associated 10% variance limit, would indicate risk and lead to the generation (230) of a challenge. Generation (230) of challenges may include the application of target parameters and differences, and in an embodiment any associated variances, to a challenge template. For example, a speeding template with the content "You are traveling X mph in a Y mph zone. That is Z % over the limit! Challenge: Maintain a speed of Y+Y*Z % mph or lower for the next 15 minutes for a chance to win $50!" In this example, applying the target parameters, differences, and variances to the template would result in a challenge that reads "You are traveling 80 mph in a 70 mph zone. That is 14% over the limit! Challenge: Maintain a speed of 77 mph or lower for the next 15 minutes for a chance to win $50". Challenge templates may be installed and accessed in the electronic device 204, in an embodiment. It should be understood that many other types of challenge templates are possible, given many other types of parameters and programming.

Challenges may be generated (230) and sent (232) to the electronic device 204 for display (234), and the vehicle operator presented with a choice of accepting (236) the challenge. In some embodiments, the challenge sent (232) to the electronic device 204 may include a textual and symbolic representation of the challenge (and/or a challenge template as described above). For example, the textual message as above reading "You are traveling 80 mph in a 70 mph zone . . . " as well as a computer-executable instruction or code; for example, "IF(SPEED>77 mph) RETURN FALSE" that expresses the challenge in executable format.

The generated (230) challenge may further cause, in some embodiments, the electronic device 204 to optionally request (238) updated vehicle data from the one or more sensors 202, that in turn capture (244) updated vehicle data. The request (238) for updated vehicle data may be sent (246) to the electronic device 204 for comparison to target parameters. In other embodiments, the updated vehicle data may be sent (248) through to the backend server 206. For example, in the above example wherein the challenge is to "maintain a speed of 77 mph or lower for the next 15 minutes", the electronic device 204 may optionally request (238) updated vehicle data from the vehicle sensors 202 over a period of 15 minutes. A period of time over which to continuously request (238) updated vehicle data may be specified in a parameter sent (232) by the backend server 206 as part of the challenge. It should be understood that vehicle sensors 202 may capture (240) updated vehicle data before a challenge sent (232) is accepted (236), in an embodiment. In some embodiments, vehicle sensors 202 may capture (244) updated vehicle data after a challenge is accepted (236). Further, capture (244) of updated vehicle data may be prompted by a request from the backend server 206.

As discussed above, profile data may be used for various purposes. In an embodiment, vehicle operator age may be accessed via profile data, and used to access or generate a challenge sent (232) to the vehicle operator, discouraging the vehicle operator from driving during certain periods of time and/or if certain conditions are present. In some embodiments, the past driving behavior of a vehicle operator may affect the risk determination (226), and challenges sent (232) may reference the past behavior and related information. For example, if the methods and systems observe that a vehicle operator drove an average of twenty miles over the speed limit in the morning, a challenge may be sent (232) incentivizing the vehicle operator to slow down in the afternoon, and specifically citing the earlier behavior and speed as a justification for the challenge.

A comparison factor may be calculated (250) and an account of the vehicle operator processed (252) based on the comparison factor. In an embodiment, the comparison factor may be computed by comparing initial vehicle data sent (214) to updated vehicle data sent (246). For example, if in the above example the vehicle operator drove all the way through the State of Illinois and then the State of Iowa after accepting the challenge, and never exceeded 77 mph, then the calculated (250) comparison factor may indicate an improvement, i.e., reduction in speed. The size or magnitude of the comparison factor calculated (250) may, in some embodiments, be the basis for processing (252) the account of the vehicle operator. In some embodiments, the challenge may be associated with an explicit offer of a discount, credit, or reward that will apply to the vehicle operator's account in the event the challenge is successfully completed. For example, a challenge may state that completion of the challenge entitles the vehicle operator to receive a 2% discount on their automobile insurance premium in the following billing cycle. The decision to process (252) may be a boolean proposition (reward/no reward) or a reward may be applied to the vehicle operator account in proportion to the calculated (250) comparison factor. In some embodiments, calculating (250) the comparison factor may include a more complex computation, such as averaging speeds observed in vehicle data over a period of time, or comparing multiple determined differences to quantify improvement (or lack thereof) over time.

In another embodiment, processing (252) the vehicle operator account may proceed according to weights associated with each target parameter. In this way, a vehicle operator may partially succeed in fulfilling a challenge, and may be partially compensated. For example, three target parameters may be involved in the generation of a challenge having respective weights of 0.7, 0.2, and 0.1. If the vehicle operator only successfully completes the portion of the challenge corresponding to the target parameter having a weighting of 0.2, as determined by the backend server 206 based on analysis of updated vehicle data, then the calculated comparison factor (250) may be multiplied by 0.2 (20%) before the vehicle operator account is processed (252).

In an embodiment, the electronic device 204 may include logic or programming instructions that cause another action to be taken prior to updated vehicle data being sent (246) to the electronic device 204. For example, the electronic device 204 may modify and re-display a challenge (234), or take another action, such as canceling or voiding the challenge. As discussed above, the challenge may be sent (232) to the electronic device 204 and displayed (234) to the vehicle operator or another individual in the vehicle, and the manner and urgency with which the challenge is displayed (234) may depend on the assigned priority level. For example, a critical priority challenge may be displayed (234) with loud colors, and/or an alert tone. Further, in some embodiments, no affirmative action is required on the part of the vehicle operator. Specifically, a challenge may be displayed (234) and affirmation or acceptance inferred by an action taken by the vehicle operator. For example, if the challenge requires the vehicle operator to slow the vehicle from 80 mph to 60 mph, then the vehicle operator's reduction in current speed from 80 mph to 60 mph, as measured by the sensors and determined by the backend server, may be interpreted to the vehicle operator's implied accession to the challenge.

As discussed above, risk may be indicated, in some embodiments, based on the variance of actual data as determined (226) when compared to target parameters. In the example above describing variance, any speed less than or more than 10% of the target speed may indicate risk. However, in some embodiments, a challenge may be generated (230) in the absence of any risk, or without respect to any indication of risk, or lack thereof. Similarly, if the vehicle operator declines (236) a challenge then processing may cease or an alternate challenge may be displayed. The functionalities of challenges are further discussed with respect to FIGS. 3-5.

FIG. 3 depicts example user interfaces 302 and 304 including example challenges. An electronic device (e.g., a mobile device like a smartphone or device integral to the vehicle) such as the electronic devices 112 and 204 depicted in FIGS. 1 and 2, respectively, may be configured to display the interfaces 302 and 304 and/or receive selections and inputs via the interfaces 302 and 304. As discussed, the electronic device may be associated with the vehicle operator via a profile. Generally, the electronic device may be associated with the vehicle or vehicle operator that receives a challenge concerning the operation of the vehicle. It should be appreciated that the interfaces 302 and 304 are merely examples and that alternative or additional content and styling is envisioned.

FIG. 3 illustrates an interface 302 that includes an indication that over a distance of 20 miles, four (4) hard braking events were detected. As discussed, the detection of hard braking may be determined, in some embodiments, by the analysis of vehicle data sent from sensors corresponding to the one or more vehicle sensors 110 and 202 of FIGS. 1 and 2, respectively. For example, vehicle data may be captured and sent from one or more vehicle sensors and received in an electronic device and backend server, such as the backend server 206 depicted in FIG. 2. The backend server may access a target hard braking parameter equal to zero. The backend server may then determine a difference between the observed instances of hard braking (4) and the target (zero) of 4. The backend server may then generate a challenge such as that depicted in interface 302, challenging the vehicle operator to drive the next 20 miles with 1 or fewer hard braking events, and offering the vehicle operator the opportunity to interact with the interface 302 by accepting (306) or declining (308) the challenge.

FIG. 3 illustrates a second interface 304 that includes an indication of a weather forecast and a humidity reading from a sensor located in a vehicle sensor, and an indication of the distance the vehicle is from a lead car. The forecast may correspond to information received from an external information source such as the information sources 108 and 208 in FIGS. 1 and 2, respectively. In an embodiment, the humidity level indicating rain may be known to the methods and systems due to vehicle data captured by sensors corresponding to the one or more vehicle sensors 110 and 202, respectively. The distance from the vehicle being operated by the vehicle operator and a lead car may be indicated by any number of vehicle data received from one or more vehicle sensors (e.g., GPS data, radar, etc).

In the illustrated embodiment, the second interface example 304 states that the vehicle operator is maintaining a distance of only 17 feet behind the lead car, and that a safe following distance on the road is 15 feet in dry weather. The safe following distance may correspond, in some embodiments, to target parameters accessed by a backend server such as the backend servers 106 and 206 in FIGS. 1 and 2, respectively. The challenge in example interface 304 requires the driver to increase their following distance to 25 feet or more, to account for the wet conditions. As discussed above with respect to FIG. 2, the environmental conditions in which the vehicle is located may affect the target parameters used in the generation of challenges by the backend server, in addition to any initial target parameters. With specific reference to example interface 304, the distance of 17 feet may not indicate risk in dry weather, because 17 is greater than the target parameter limit of 15 feet on the particular road in which the vehicle is traveling. However, due to the detection of wet conditions, the target distance is adjusted upward to 25 feet, indicating risk and causing a challenge to be generated because 17 feet is less than the target of 25 feet. It should be appreciated that although the difference between target parameters and actual vehicle operation comprises a simple subtraction in example interface 304, more complex, multivariate computations may be performed, in some embodiments, to quantify risk under varying conditions. In some embodiments, challenges may be grouped into categories by type (e.g., "wet weather challenges"), difficulty levels, or other characteristics.

Additional messages may be displayed in the interface 304 that may depend on the actions taken by the vehicle operator. In an embodiment, the interface may be updated as updated vehicle data becomes available, while a challenge is still underway and has not yet reached either a success or failure state. Messages displayed subsequent to the vehicle operator's having accepted a challenge, while the challenge is in progress, may indicate that the vehicle operator has accepted a challenge, and may provide information pertaining to the challenge. The interface may contain a warning, based on real-time analysis of vehicle operation data, that the vehicle operator is at risk of failing the challenge. The interface may depict the position, speed, or other attributes pertaining to the vehicle being driven by the vehicle operator currently participating in the challenge, as well information about other vehicles in proximity to the vehicle, along with information relating the two vehicles to one another, such as the distance between the two. The interface may display graphically an indication of an action the vehicle operator should take, or a state in which the vehicle being driven by the vehicle operator should be placed, in order to comply with the requirements of the challenge. For example, if as in the above example, the challenge is to maintain a distance of 25 feet from the lead car, an interface may display a graphical representation of the vehicle's current position in real-time, in relation to the lead car, and a second graphical representation of where the vehicle would need to be in order to maintain the required distance. The interface may also provide imperatives related to completion of the challenge, such as a red stop sign or a message to "slow down". If the vehicle operator slows the vehicle, increasing the following distance to 30 feet, then a challenge success message may be displayed. Conversely, if the vehicle operator increases speed and closes the distance between the vehicle and lead car, then a warning or challenge fail message may be displayed. Further, a warning zone may be shown, which may be illustrated in a vibrant or cautionary color scheme, in an embodiment. It should be understood that many different types of challenge visualizations are envisioned, depending upon the type of challenge and real-time status of vehicle data.

In some embodiments, an interface may depict that an accepted challenge has been failed due to the vehicle operator's not acting in accordance with the requirements of the challenge. In some embodiments, the interface may include information stating that the vehicle operator has failed to challenge, and may provide a specific vehicle operation data-based rationale as to why that is the case. For example, the interface may state that the vehicle operator "braked hard", as measured by a number of miles/second^2. Such a ratio may be converted into a human-readable expression explaining the failure to the vehicle operator (e.g., "from 70 mph to 40 mph in 2 seconds"). It should be understood that many other examples are envisioned that express unfavorable driving behaviors in terms of quantitative measurements that may be represented textually and/or graphically. The challenge interfaces may also include a component allowing the vehicle operator to selectively retry a failed challenge.

Figure 4:
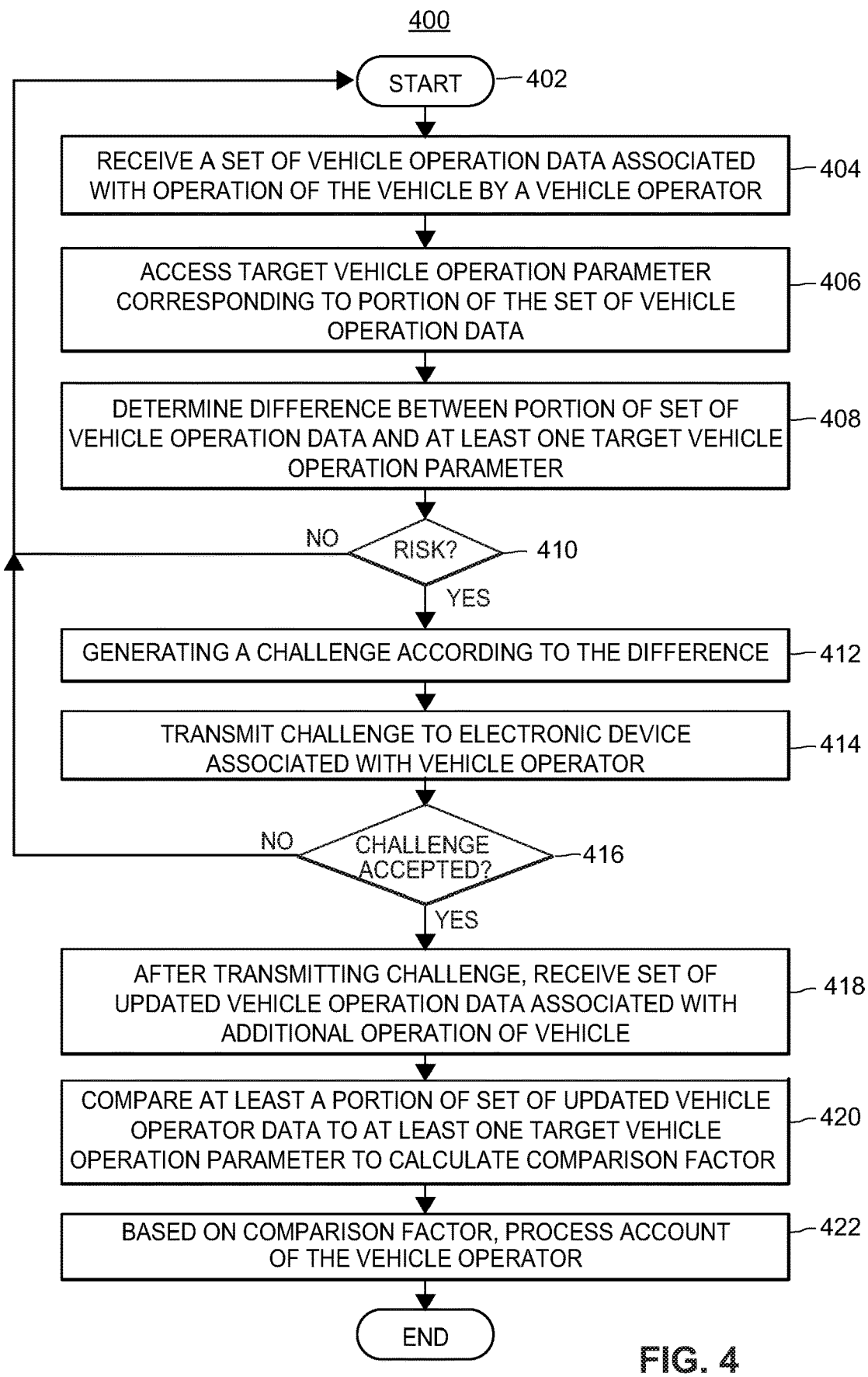
FIG. 4 depicts an exemplary flow diagram associated with managing challenges and account processing, in accordance with some embodiments.

FIG. 4 depicts a block diagram of an exemplary method 400 of challenging users to improve driving behavior. The method may be facilitated by a backend server, that may respectively correspond to the electronic devices 112 and 204, and backend servers 106 and 206 as discussed in FIGS. 1 and 2, that may communicate with an electronic device that may be located within the vehicle or incorporated into the vehicle. The electronic device may support execution of a dedicated application facilitating the functionalities of the method. Further, the electronic device may enable an individual to make various selections and facilitate other functionality.

The method 400 may begin 402 when the backend server receives (404) a set of vehicle operation data associated with operation of the vehicle by the vehicle operator. In embodiments, the vehicle operation data may be real-time or delayed data from one or more sensors within or affixed to the interior of the vehicle. In embodiments, the vehicle operation data represents various properties or attributes of the vehicle itself, such as the amount of fuel remaining in the gas tank, its speed, its elevation and heading, engine time, etc.

The backend server may access (406) at least one target vehicle operation parameter corresponding to at least a portion of the set of vehicle operation data. In an embodiment, the at least one target vehicle operation parameter may be accessed from an electronic database local to, or remote from, the backend server. In an embodiment, the target vehicle operation parameter may be selected based on the type of vehicle operation data received by the backend server, and may depend on conditions or data obtained from one or more external data sources.

The backend server may determine (408) a difference between the set of vehicle operation data and the at least one target vehicle operation parameter. In an embodiment, the difference may be performed as a simple subtraction, or may be the result of a more complex computation. In an embodiment, the computation will be prioritized based on the relative importance or criticality of a given vehicle operation parameter, and may be short-circuited or stopped before all vehicle operation is examined if, for example, the backend server identifies a problematic or risky result requiring immediate attention.

The backend server may identify a risk (410) that corresponds to the vehicle operation data. In embodiments, the electronic device may access a data structure or database to identify the risk that corresponds to the state of the vehicle data, where the risk may have a probability of occurrence. In an embodiment, risk may be computed based on a future path of the vehicle, or an anticipated convergence of conditions (e.g., that the vehicle is driving due North at 50 miles per hour, and that a snowstorm is estimated to strike an area 50 miles to the North in one hour). If no risk is identified, then the method may return to the beginning and reiterate (426).

The backend server may generate a challenge (412) according to the difference between the set of vehicle operation data and the at least one target vehicle operation parameter, and/or associated risk calculations, where the challenge may be configured to encourage the vehicle operator to modify driving behavior. In an embodiment, the challenge may instruct the vehicle operator to perform a specific action, such as using turn signals when changing lanes. In an embodiment, the challenge may instruct the vehicle operator to avoid certain acts, such as slamming on the brakes. In embodiments, challenges may have an associated type, such as "wet weather" challenges, "children playing", "historically risky roads", etc. In still further embodiments, a challenge may be comprised of multiple sub-types. And in yet more embodiments, challenges may have a difficulty level, such as easy, medium, or hard. The generation of challenges by the backend server may be based on previously-generated challenges, such that a first challenge is of difficulty easy, a second challenge of difficulty medium, and a third of difficulty hard. The vehicle operator may be shown a user interface selection that displays multiple challenges in a tabular format, where the rows represent different challenges and the columns represent increasing levels of difficulty. Challenges that the vehicle operator has successfully (or unsuccessfully) attempted may be indicated. New challenges may be displayed that have a different (i.e., more difficult or less difficult) difficulty level. In some embodiments, challenges may be generated that are of a selected or preset difficulty level.

In an embodiment, a challenge may be sent to the vehicle operator before they are operating the vehicle. And, a challenge may consist of an instruction to not operate the vehicle for a time period (i.e., "do not drive your car today").

The challenge may be transmitted via a network to the electronic device that displays (414) the challenge for review by the vehicle operator in a user interface. In an embodiment, the vehicle operator may accept or decline (416) the challenge by a physical or verbal act, for example by speaking the words "accept" or "decline" or by a touchscreen, via eye tracking, etc. If the challenge is not accepted by the vehicle operator, the method may return to the beginning and reiterate.

In an embodiment, the backend server may, after the vehicle operator accepts the challenge, receive (418) a set of updated vehicle operation data associated with additional operation of the vehicle by the vehicle operator. In an embodiment, the updated vehicle operation data corresponds directly to the types of data underlying the accepted challenge. For example, if the accepted challenge is to drive slowly while it is snowing, the backend server may receive updated speed telemetry data from the vehicle, as well as updated local weather from an information source. It should be understood that any combination of vehicle operation data pertaining to operation of the vehicle, and environmental data may comprise the set of information upon which challenges are created and validated.

In an embodiment, an accepted challenge may be "lifted", or may be discontinued if a condition underlying the challenge disappears, based upon information received from sensors in the vehicle, the electronic device, the backend server, and/or the external information source. For example, if a challenge is to drive the speed limit in the rain, the challenge may automatically conclude when the vehicle operator drives out of the storm into an area that is completely dry. Such an occurrence may be considered successful completion of a challenge, or may not have a dispositive result. In general, it should be appreciated that the requirements for "winning" a challenge may be subject to complex rules, formulae, and algorithms.

The backend server may, in some embodiments, compare (420) at least a portion of the set of updated vehicle operation data to the at least one target vehicle operation parameter to calculate a comparison factor. For example, if a challenge is generated suggesting that the vehicle operator slow down by 5 mph, then updated vehicle operation data may be compared to the initial recommended action to determine whether and to what extent the vehicle operator has modified their behavior; that is, whether the vehicle operator has reduced speed by more or less than 5 mph. In an embodiment, the comparison factor, comprising the difference between the initial speed and updated speed, may be computed as an average or estimated. For example, any value within 20% of the modification suggested in the challenge may be sufficient to consider the challenge "successful". In some embodiments, an indication of the updated vehicle operation data and/or the comparison factor may be depicted in a user interface. For example, the display may be updated to read that the updated vehicle operation data indicates a speed of 70 mph, and that the updated speed is a 20% reduction in speed.

The backend server may, based on the comparison factor, process (422) the account of the vehicle operator. In an embodiment, a discount or credit may be applied to the account. In yet another embodiment, the account may be marked or categorized as being associated with a number of successful challenges. For example, the owner of the account had completed five successful challenges within a six-month period. In an embodiment, the account processing step may comprise the addition of a gift, such as free ice cream.

Figure 5:
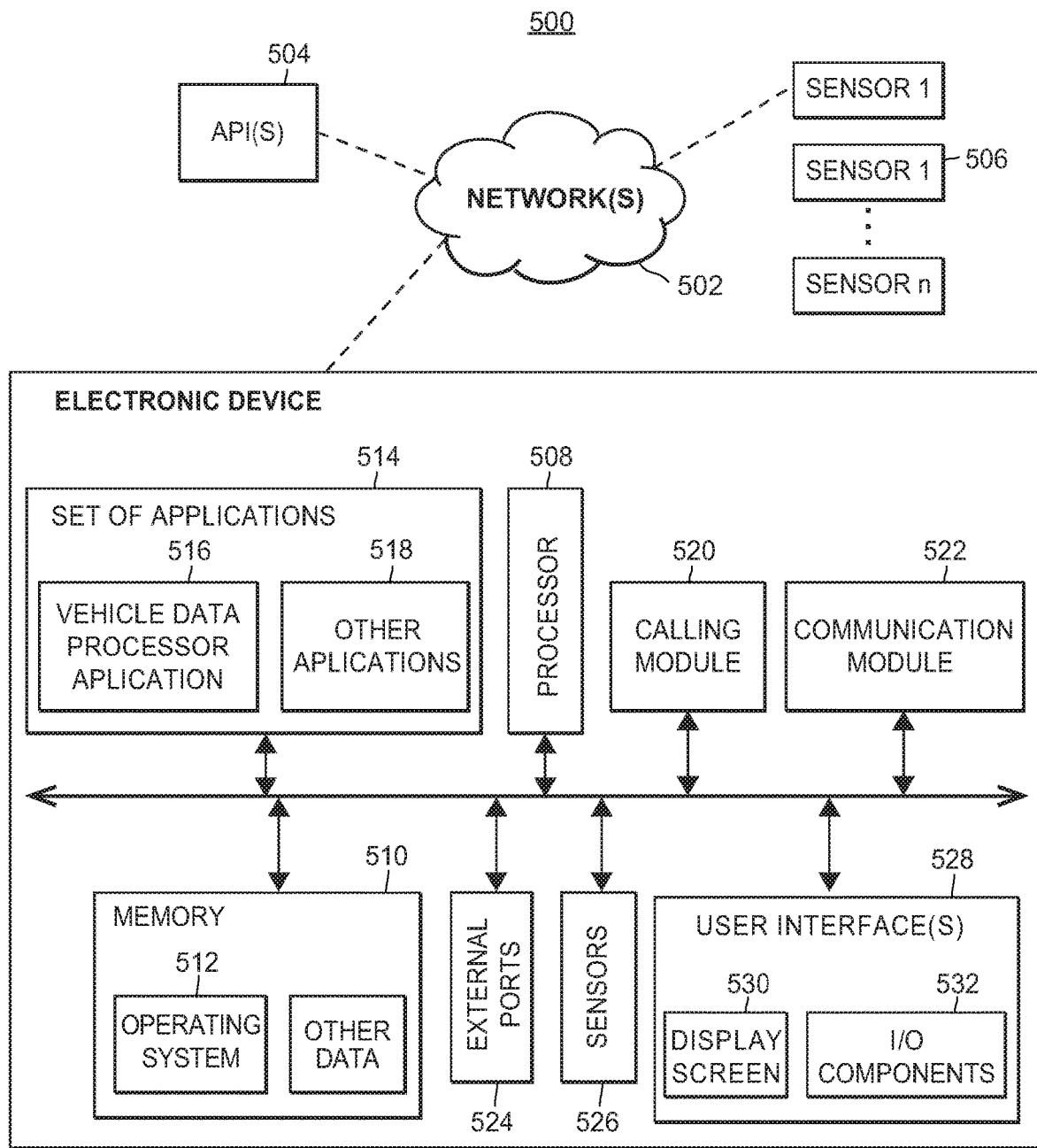
FIG. 5 is a block diagram of an exemplary electronic device, in accordance with some embodiments.

FIG. 5 illustrates a diagram of an exemplary mobile or other electronic device 500 (such as one of the electronic devices 112 and/or 204 as discussed with respect to FIGS. 1 and 2 in which the functionalities as discussed herein may be implemented. It should be appreciated that the electronic device 500 may be configured to be transported in the vehicle and/or connect to an on-board telematics platform of the vehicle as discussed herein. FIG. 5 is shown as being connectively coupled to one or more networks 502, enabling it to access API(s) 504 (for example, an external information source such as the external information sources 108 and 208 as discussed with respect to FIGS. 1 and 2, respectively) and one or more sensors 506, that may correspond to the one or more vehicle sensors 110 and 202 discussed with respect to FIGS. 1 and 2. Further, it should be appreciated that the electronic device 500 may be integrated into an on-board system of the vehicle, such as the built-in system 114 as depicted in FIG. 1.

The electronic device 500 may include a processor 508 as well as a memory 510. The memory 510 may store an operating system 512 capable of facilitating the functionalities as discussed herein as well as a set of applications 514 (i.e., machine readable instructions). For example, one of the set of applications 514 may be a vehicle data processor application 516 configured to collect and transmit sensor data, and to receive and display challenges. It should be appreciated that one or more other applications 518 are envisioned.

The electronic device 500 may include a caching module 520. The caching module 520 may be configured to store data from sensors 506 for retrieval by a backend server, such as the backend server 106 depicted in FIG. 1

The processor 508 may interface with the memory 510 to execute the operating system 512 and the set of applications 514. According to some embodiments, the memory 510 may also include other data that may include any data (e.g., profile data, telematics data, location data, etc.) related to facilitating the functionalities as discussed herein. The memory 510 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 500 may further include a communication module 522 configured to communicate data via one or more networks, such has network(s) 502. According to some embodiments, the communication module 522 may include one or more transceivers (e.g., WWAN, WLAN, and/or WPAN transceivers) functioning in accordance with IEEE standards, 3GPP standards, or other standards, and configured to receive and transmit data via one or more external ports 524. Further, the communication module may include a short-range network component (e.g., an RFID reader) configured for short-range network communications. For example, the communication module 522 may receive, via the network, data from a set of sensors 506. For further example, the communication module may transmit, via the network, sensor data to a backend server and/or other networked components.

The electronic device 500 may further include a set of sensors 526. The processor 508 and the set of applications 514 may interface with the set of sensors 508 to retrieve and process the corresponding sensor data. The set of sensors 508 may include, for example, a location module, an accelerometer, a gyroscope, one or more photographic sensors, and/or the like. In one particular implementation, the vehicle data processor application 516 may use various data from the set of sensors 526 to facilitate certain functionalities.

The electronic device 500 may further include a user interface 528 configured to present information to the vehicle operator and/or receive inputs from the vehicle operator. As depicted in FIG. 5, the user interface 528 may include a display screen 530 and I/O components 532 (e.g., ports, capacitive or resistive touch sensitive input panels, keys, buttons, lights, LEDs, speakers, microphones). According to some embodiments, the user may access the electronic device 500 via the user interface 528 to review information, such as challenges, and/or perform other functions, such as accepting or declining challenges. In some embodiments, the electronic device 500 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor (e.g., working in connection with the operating system) to facilitate the functions as described herein. In this regard, the program code may be implemented in any desired language, and may be implemented as machine code, assembly code, byte code, interpretable source code or the like (e.g., via C, C++, Python, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

Additional Considerations

With the foregoing, an insurance customer may opt-in to a rewards, insurance discount, or other type of program. After the insurance customer provides their affirmative consent, an insurance provider remote server may collect data from the customer's mobile device, smart vehicle controller, or other smart devices—such as with the customer's permission or affirmative consent. The data collected may be related to certain functionalities or profiles, and/or insured assets before (and/or after) an insurance-related event, including those events discussed elsewhere herein. In return, risk averse insureds, vehicle owners, home owners, or home or apartment occupants may receive discounts or insurance cost savings related to home, renters, personal articles, auto, and other types of insurance from the insurance provider.

In one aspect, smart or autonomous vehicle data, smart or interconnected home data, mobile device data, social media data, and/or other data, including the types of data discussed elsewhere herein, may be collected or received by an insurance provider remote server, such as via direct or indirect wireless communication or data transmission from a smart or autonomous vehicle, mobile device, smart home controller, other customer computing device, or customer social media content after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as vehicles, personal belongings, or homes, and/or (ii) vehicle, home or apartment occupants.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and method of facilitating driving behavior modification through driving challenges through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method for improving driving behavior, the method comprising:
   accessing a target vehicle operation parameter corresponding to a portion of a set of vehicle operation data associated with operation of a vehicle by a vehicle operator;
   determining a difference between the portion of the set of vehicle operation data and the target vehicle operation parameter;
   generating a challenge configured to encourage the vehicle operator to modify driving behavior based upon the difference;
   receiving a set of updated vehicle operation data associated with additional operation of the vehicle by the vehicle operator after transmitting the challenge to the vehicle operator;
   comparing a portion of the set of updated vehicle operator data to the target vehicle operation parameter to determine a comparison factor; and
   processing an account of the vehicle operator based upon the comparison factor.

2. The computer-implemented method of claim 1, wherein generating the challenge based upon the difference includes analyzing an attribute of the vehicle operator.

3. The computer-implemented method of claim 1, further comprising receiving the set of vehicle operation data from a sensor associated with the vehicle.

4. The computer-implemented method of claim 1, wherein accessing the target vehicle operation parameter corresponding to the portion of the set of vehicle operation data includes accessing an application programming interface associated with an application.

5. The computer-implemented method of claim 1, wherein accessing the target vehicle operation parameter includes accessing a historical vehicle operation parameter.

6. The computer-implemented method of claim 1, wherein:
   the target vehicle operation parameter includes an associated parameter weight; and
   processing the account of the vehicle operator is further based upon the associated parameter weight.

7. The computer-implemented method of claim 1, further comprising:
   generating the challenge to have a plurality of difficulty levels;
   determining that the vehicle operator has completed the challenge having a selected difficulty level from the plurality of difficulty levels; and
   transmitting the challenge having an updated difficulty level different from the selected difficulty level.

8. The computer-implemented method of claim 1, wherein generating the challenge includes generating the challenge having a difficulty level.

9. The computer-implemented method of claim 1, further comprising analyzing the set of vehicle operation data to identify a set of events undertaken during the operation of the vehicle.

10. The computer-implemented method of claim 1, further comprising transmitting data indicative of the comparison factor and the portion of the updated vehicle operation data.

11. A computing device for improving driving behavior, the device comprising:
    a processor; and
    a memory storing instructions that, when executed by the processor, cause the processor to:

access a target vehicle operation parameter corresponding to a portion of a set of vehicle operation data associated with operation of a vehicle by a vehicle operator;

determine a difference between the portion of the set of vehicle operation data and the target vehicle operation parameter;

generate a challenge configured to encourage the vehicle operator to modify driving behavior based upon the difference;

receive a set of updated vehicle operation data associated with additional operation of the vehicle by the vehicle operator after transmitting the challenge to the vehicle operator;

compare a portion of the set of updated vehicle operator data to the target vehicle operation parameter to determine a comparison factor; and process an account of the vehicle operator based upon the comparison factor.

12. The computing device of claim 11, wherein the instructions, when executed by the processor, that cause the processor to generate the challenge based upon the difference further include instructions that cause the processor to analyze an attribute of the vehicle operator.

13. The computing device of claim 11, wherein the instructions that, when executed by the processor, further cause the processor to receive the set of vehicle operation data from a sensor associated with the vehicle.

14. The computing device of claim 11, wherein the instructions, when executed by the processor, that cause the processor to access the target vehicle operation parameter corresponding to the portion of the set of vehicle operation data further include instructions that cause the processor to access an application programming interface associated with an application.

15. The computing device of claim 11, wherein the instructions, when executed by the processor, that cause the processor to access the target vehicle operation parameter further include instructions that cause the processor to access a historical vehicle operation parameter.

16. The computing device of claim 11, wherein:

the target vehicle operation parameter includes an associated parameter weight; and the instructions, when executed by the processor, that cause the processor to process the account of the vehicle operator further include instructions that cause the processor to process the account of the vehicle operator based upon the associated parameter weight.

17. The computing device of claim 11, wherein the instructions that, when executed by the processor, further cause the processor to:

generate the challenge to have a plurality of difficulty levels;

determine that the vehicle operator has completed the challenge having a selected difficulty level from the plurality of difficulty levels; and transmit the challenge having an updated difficulty level different from the selected difficulty level.

18. The computing device of claim 11, wherein the instructions, when executed by the processor, that cause the processor to generate the challenge further include instructions that cause the processor to generate the challenge having a difficulty level.

19. The computing device of claim 11, wherein the instructions that, when executed by the processor, further cause the processor to analyze the set of vehicle operation data to identify a set of events undertaken during the operation of the vehicle.

20. The computing device of claim 11, wherein the instructions that, when executed by the processor, further cause the processor to transmit data indicative of the comparison factor and the portion of the updated vehicle operation data.

* * * * *